United States Patent [19]

Gyongyosi

[11] 4,145,814

[45] Mar. 27, 1979

[54] CAM TRACKER WITH SLIDABLE CAM FOLLOWER

[76] Inventor: Josef Gyongyosi, P.O. Box 314, Southfield, Mich. 48075

[21] Appl. No.: 884,628

[22] Filed: Mar. 6, 1978

Related U.S. Application Data

[63] Continuation-in-part of Ser. No. 752,832, Dec. 21, 1976, Pat. No. 4,085,508.

[51] Int. Cl.$^2$ .............................................. B25D 5/30
[52] U.S. Cl. .................................... 33/27 K; 90/13 B; 90/13.2; 144/142
[58] Field of Search ................... 33/23 H, 23 K, 27 R, 33/27 K, 30 B; 83/565; 90/13 B, 13.2; 118/317, 323; 144/142, 144 R, 144 A, 144.5

[56] References Cited

U.S. PATENT DOCUMENTS

| | | | |
|---|---|---|---|
| 2,156,847 | 5/1939 | Gregory | 33/27 K |
| 2,612,689 | 10/1952 | Kirkman et al. | 33/27 K |
| 3,047,953 | 8/1962 | Billinger | 33/27 K |

FOREIGN PATENT DOCUMENTS

231969 10/1958 Australia ................................. 83/565

*Primary Examiner*—Richard E. Aegerter
*Assistant Examiner*—John W. Shepperd
*Attorney, Agent, or Firm*—Clarence A. O'Brien; Harvey B. Jacobson

[57] ABSTRACT

A cam tracker including a master cam with a cam surface thereon engaged by a driven master cam follower contacting the master cam surface and a control cam with a cam surface thereon spaced axially from the master cam and arranged in opposed relation thereto and a control cam follower in rolling contact with the control cam surface with supporting means for the control cam follower including a resiliently biased, slidable support structure mounted on the shaft which supports and drives the master cam follower to resiliently retain the control cam follower in contact with the control cam surface and resiliently bias the master cam follower in the opposite direction in contact with the master cam surface.

7 Claims, 4 Drawing Figures

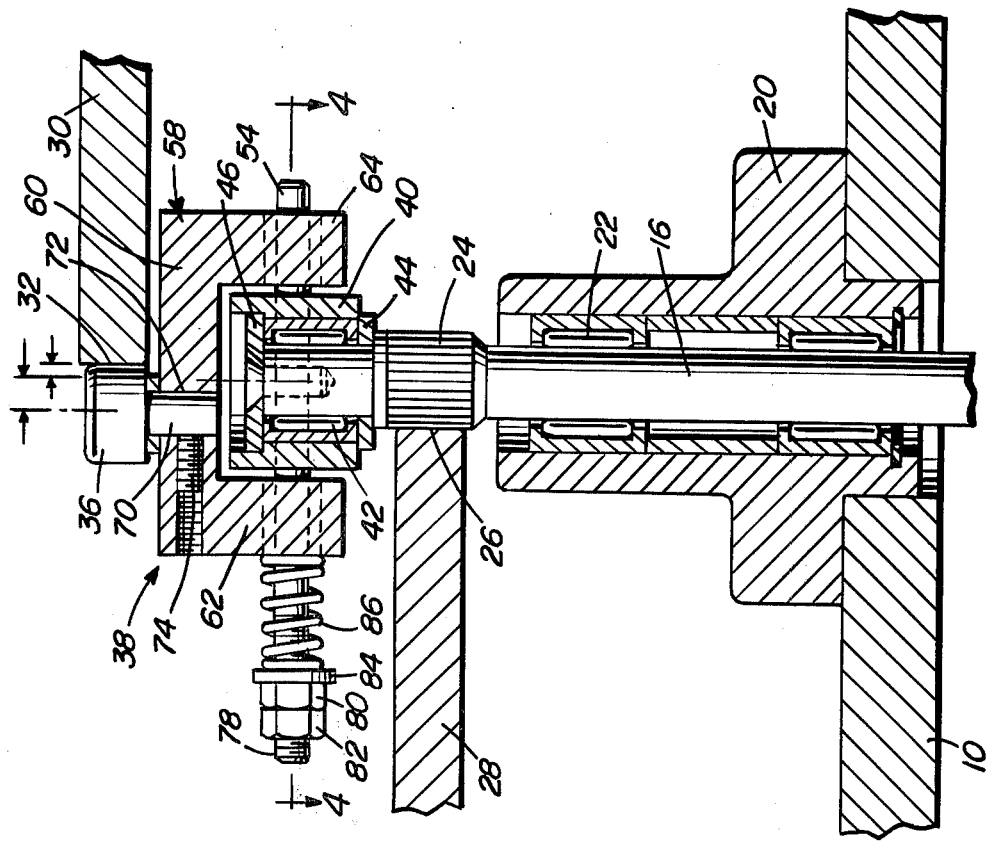
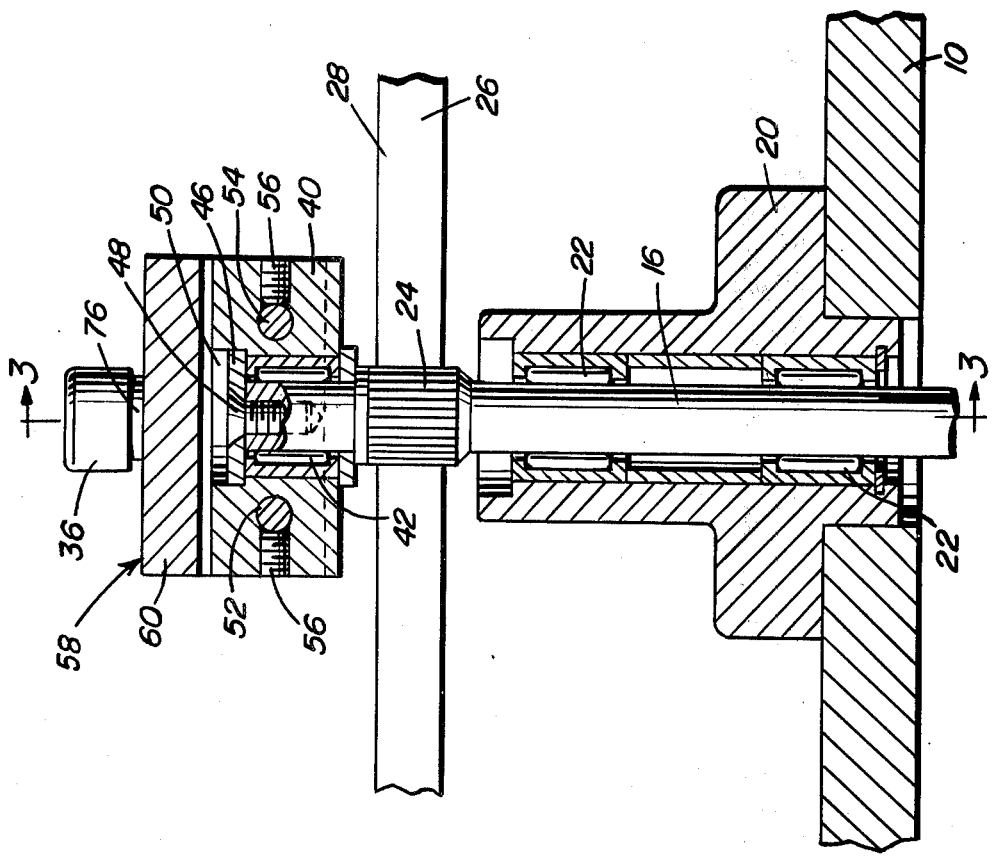

CAM TRACKER WITH SLIDABLE CAM FOLLOWER

CROSS REFERENCE TO RELATED APPLICATION

This application is a continuation-in-part of co-pending application Ser. No. 752,832, filed Dec. 21, 1976, now U.S. Pat. No. 4,085,508 issued Apr. 25, 1978 for TWIN TEMPLATE CAM TRACKER.

BACKGROUND OF THE INVENTION

1. Field of the Invention

The present invention generally relates to a structure for supporting and controlling movement of a tool, workpiece or the like in accordance with a pattern defined by a cam surface and includes a driven cam follower engaging the cam surface on a stationary master cam and a control cam member having a cam surface thereon which is engaged by a control cam follower with the cam surfaces on the master cam and control cam being opposed to each other and the control cam follower being resiliently biased toward the control cam surface to maintain a substantially constant relationship between the master cam surface and the driven master cam follower engaged therewith.

2. Description of the Prior Art

The control of movement of various machines, tools, workpieces and the like by using a cam or template engaged by a driven follower is well known and one of the problems which has existed in this type of device is maintaining proper contact between the cam surface and the follower. The following patents are exemplary of the development in this art.

U.S. Pat. Nos. 2,045,586; 2,156,847; 2,270,462; 3,555,944; 1,172,933; 3,047,953; 3,537,345; and Australian Pat. No. 231,969.

SUMMARY OF THE INVENTION

An object of the present invention is to provide a cam tracker which includes a master cam, cam surface and driven cam follower mounted on a drive shaft and a control cam with a cam surface and control cam follower engaged therewith with the control cam follower being resiliently biased towards the control cam surface and supported on the drive shaft for the master cam follower in a manner to move transversely of the axis of the master cam follower drive shaft with the force exerted on the control cam surface by the control cam follower being opposed to the force exerted by engagement between the master cam follower and master cam surface.

Another object of the present invention is to provide a cam tracker in accordance with the preceding object in which the supporting structure for the control cam follower is rotatably journaled on an end of the master cam follower drive shaft and is in the form of a housing journaled thereon by suitable bearing means and retaining structure and a slide member supported from the housing by a pair of guide shafts fixed to the housing and slidably supporting the slide for transverse movement in perpendicular relation to the rotational axis of the drive shaft with spring means associated with each of the shafts and slide to bias the slide in one direction thereby biasing the control cam follower journaled on the slide toward the control cam surface.

These together with other objects and advantages which will become subsequently apparent, reside in the details of construction and operation as more fully hereinafter described and claimed, reference being had to the accompanying drawings forming a paret hereof, wherein like numerals refer to like parts throughout.

BRIEF DESCRIPTION OF THE DRAWINGS

FIG. 2 is a vertical sectional view, on an enlarged scale, taken substantially upon a plane passing along section line 2—2 of FIG. 1 illustrating further structural details of the cam tracker.

FIG. 3 is a vertical sectional view taken substantially upon a plane passing along section line 3—3 of FIG. 2 illustrating additional details of the supporting structure for the control cam follower.

DESCRIPTION OF THE PREFERRED EMBODIMENT

Figure 1:
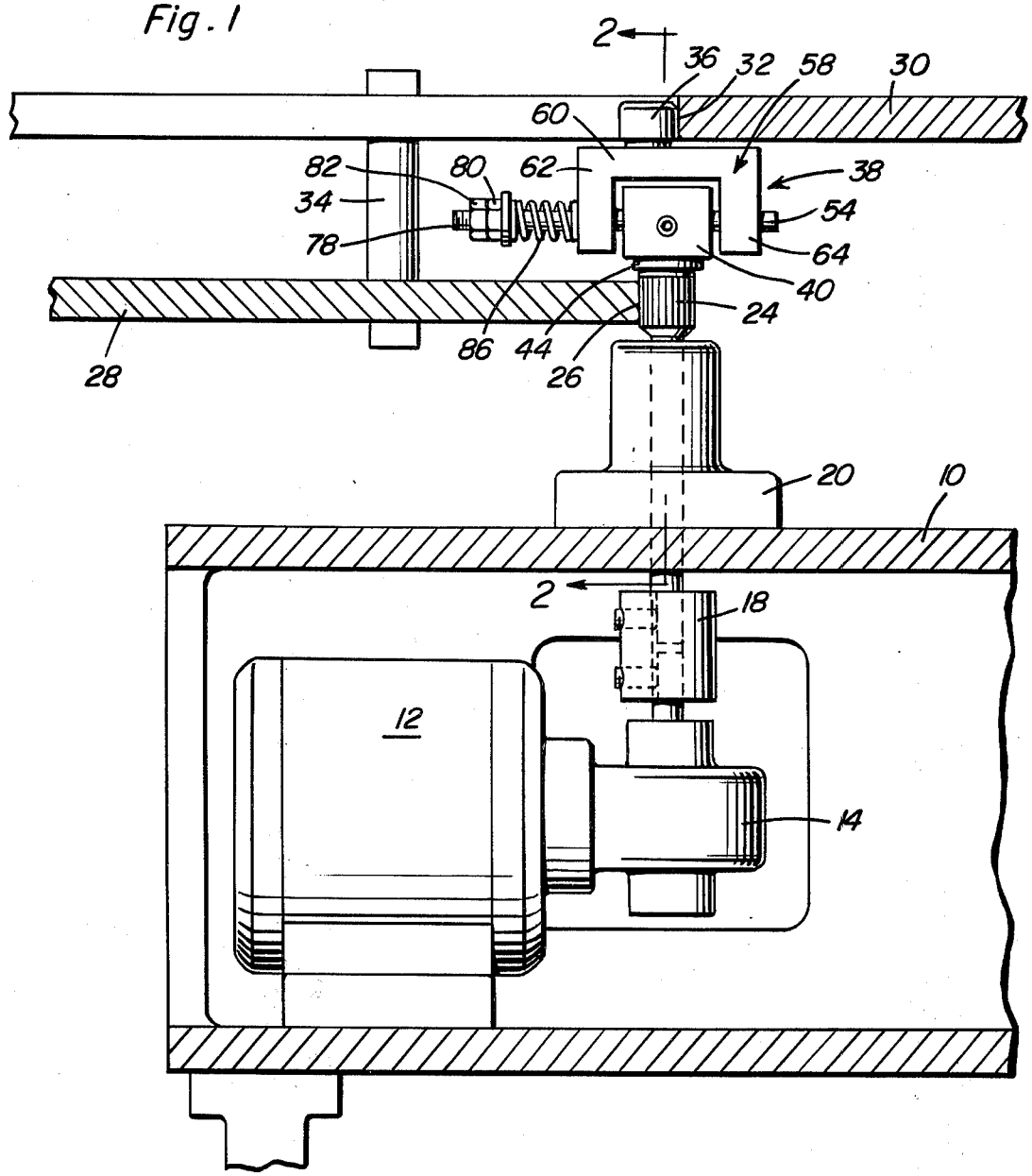
FIG. 1 is a fragmental elevational view of a machine utilizing the cam tracker of the present invention.

The cam tracker of the present invention is disclosed in association with a machine having a carriage 10 that is supported for translatory movement so that a tool, dispensing gun, workpiece or the like on the carriage may be moved in a predetermined pattern. The carriage may be supported for any type of translatory movement and may be associated with a machine in the same manner as that disclosed in co-pending application Ser. No. 752,832 which disclosure is incorporated herein by reference thereto. The specific structure of the machine, tool or workpiece supported thereby forms no particular part of the present invention which relates to the structure for controlling movement of the carriage 10. The carriage 10 which may be in the form of a housing or the like has a drive motor 12 mounted thereon in any suitable manner with a reduction gear assembly 14 connected with the motor and connected to a drive shaft 16 through a coupler 18 in a conventional and well known manner which is substantially the same as that illustrated in the co-pending application. The drive shaft 16 is supported rotatably from a drive shaft housing 20 supported from the carriage or housing 10 in any suitable manner with bearing structures 22 being provided between the drive shaft housing 20 and the drive shaft 16 to rotatably journal and support the drive shaft 16.

The drive shaft 16 includes a master cam follower 24 rigid with and preferably integral therewith in driving engagement with an external or outside cam surface 26 on a stationary master cam 28 so that as the drive shaft 16 is rotated by the motor 12, the carriage and associated machine components, tool, workpiece or the like will be moved in accordance with the pattern defined by the master cam surface 26 in the same manner as in the co-pending application. The external surface of the master cam follower 24 may be serrated, roughened or otherwise provided with an anti-slipping surface in engagement with the master cam surface 26.

Supported above the stationary master cam 28 is a stationary control cam 30 having a control cam surface 32 thereon which is an interior surface disposed in axially spaced relation to the master cam surface 26 and in opposed relation thereto. The control cam 30 is supported in spaced relation to the master cam 28 by supporting and spacing structure 34.

A control cam follower 36 is engaged with the control cam surface 32 with the control cam follower 36 being in the form of a freely rotatable roller in rolling contact with the control cam surface 32, whereas the master cam follower which is also in the form of a cylindrical roller rigid with the drive shaft 16 is driven by the drive shaft 16 which relationship is the same as that disclosed in the co-pending application.

Figure 4:
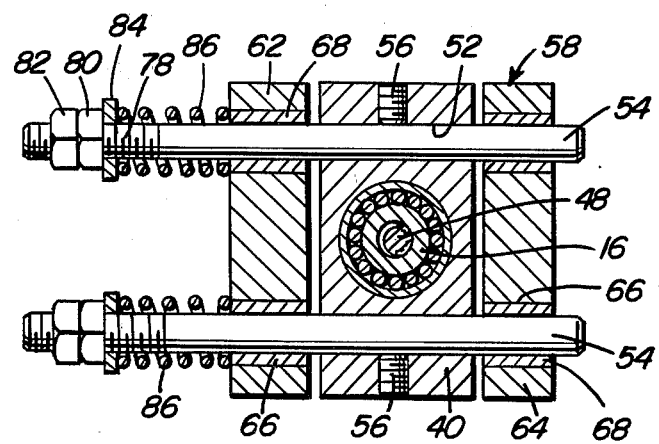
FIG. 4 is a transverse sectional view taken substantially upon a plane passing along section line 4—4 of FIG. 3 illustrating further structural details of the guide shafts and resilient structure for biasing the control cam follower into engagement with the control cam surface.

The drive shaft 16 extends above the master cam follower 24 and has mounted thereon a slidable support structure generally designated by numeral 38 for supporting the control cam follower 36 from the shaft 16. The slidable support 38 includes a housing means defined by a housing 40 which is rotatably supported from the shaft 16 by bearings 42 with a washer 44 at the bottom of the housing and a washer 46 engaging the upper end of the shaft 16 and secured thereto by a countersunk screw 48. The washer 44 rests against a shoulder on the shaft 16 and the washer 46 is received in a counterbore 50 in the upper end of the housing 40 and also engages the upper end of the bearing 42 thus rotatably retaining the housing 40 on the upper end of the drive shaft 16 which enables the housing 40 to be stationary while the drive shaft 16 rotates internally thereof. The housing 40 is generally in the form of a rectangular body or block as illustrated in FIGS. 2 and 4 and includes a pair of parallel passageways 52 therethrough which are disposed adjacent the opposite sides of the housing 40 as illustrated in FIG. 4. Each of the passageways 52 includes a guiding and supporting shaft 54 extending therethrough and adjustably and rigidly secured therein by laterally extending set screws 56 extending inwardly from the side edges of the housing 40 with the inner ends engaging the shafts 54 as illustrated in FIGS. 2 and 4. The housing 40 along with the guide shafts 54 remain substantially stationary and the guide shafts 54 are generally perpendicular the rotational axis of the drive shaft 16 and spaced equally to either side thereof.

The slide support 38 also includes a mounting member or slide member 58 which is generally an inverted U-shaped member including a top web or bight portion 60 and depending legs 62 and 64 which are in spaced parallel relation to each other and are disposed in generally spaced parallel relation to the edges of the housing 40. Each of the legs 62 and 64 is provided with apertures 66 which receive the shafts 54 with bushing-type bearings 68 interposed between the shafts 54 and the apertures 66 as illustrated in FIG. 4. With this construction, the slide member 58 can move laterally as guided by the guide shafts 54 within the limits defined by the space between the inner surface of the legs 62 and 64 and the exterior of the housing 40.

The control cam follower 36 includes a depending supporting rod or shaft 70 on which the follower, in the form of a roller, is rotatably journaled by suitable bearing structure with the shaft 70 being received in an aperture 72 in the web 60 of the slide member 58 and releasably but rigidly secured therein by a set screw threaded inwardly from an end edge of the web 60 as illustrated in FIG. 3. A spacer or washer 76 is disposed between the cam follower and the web 60 to properly position the control cam follower 36 with respect to the control cam surface 32.

In order to bias the control cam follower 36 toward the control cam surface 32, one end of each of the guide shafts 54 is provided with external threads 78 receiving an adjusting nut 80 and a lock nut 82 along with a washer 84 engaging the inner edge of the nut 80 and the end of a compression coil spring 86 interposed between the washer 84 and the adjacent surface of the leg 62 of the slide member 58 as illustrated in FIGS. 3 and 4. Thus, the springs 86 bias the slide member 58 and the control cam follower 36 toward the control cam surface 32, and the control cam surface 32 exerts a force on the control cam follower 36 which is in opposed relation to the lateral force between the driven master cam follower 24 and the master cam surface 26. The control cam 30, control cam surface 32 and spring biased control cam follower 36 provide a force which counteracts the cantilever forces exerted on the drive shaft 16 by the master cam follower 24 engaged with the master cam surface 26 thereby maintaining the driven master cam follower or roller in effective driving contact with the master cam surface 26. Mounting of the spring biased control cam follower 36 in a cantilever manner on the end of the drive shaft 16 overcomes the tendency of the drive shaft 16 to deflect laterally which tends to cause the driven master cam follower 24 to climb or move laterally on the master cam surface 26 as the carriage or housing 10 moves in the pattern defined by the master cam surface 26. This structure provides a balanced assembly and the force exerted on the drive shaft 16 by the cam follower 36 may be adjusted by adjusting the compression of the springs 86 by adjusting the nuts 80 and 82 in a well known manner. Further, the components of the device may be easily assembled and disassembled for adjustment and/or repair or replacement when necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, failing within the scope of the invention.

What is claimed as new is as follows:

1. A cam tracker comprising a master cam having a master cam surface thereon, means supporting said master cam, a master cam follower, a drive shaft supporting said cam follower in rolling contact with said cam surface on said master cam, means rotatably supporting said drive shaft, drive means connected with said drive shaft for rotating the drive shaft and cam follower thereby moving the cam follower and cam surface in relation to each other, a control cam having a control cam surface thereon, means supporting said control cam in axially spaced, fixed relation to the master cam with the control cam surface being in radially opposed relation to the master cam surface, a control cam follower, means supporting said control cam follower in rolling contact with said control cam surface with the control cam follower being freely rotatably supported by its supporting means, said supporting means for the cam follower including a laterally slidable mounting member rotatably journaling said control cam follower, housing means rotatably mounted on said drive shaft, means slidably supporting said mounting member from said housing means, and resilient means connected between said mounting member and said housing means to resiliently bias the mounting member in one direction to resiliently retain the control cam follower in rolling contact with the control cam surface and to resiliently bias said master cam follower in the opposite direction into rolling contact with said master cam.

2. The structure as defined in claim 1 wherein said housing means is mounted directly on said drive shaft axially outwardly of said master cam follower, bearing means supporting the housing means from the drive shaft to enable the housing means to remain stationary during rotation of the drive shaft, said means supporting the mounting member from the housing means including a pair of transverse guide shafts on the housing means for supporting the mounting member for transverse sliding movement relative to the rotational axis of the drive shaft, said resilient means including a compression coil spring on each guide shaft and engaged between the mounting member and housing means to bias the mounting member in one direction, said control cam follower including a roller journaled on the mounting member with the axis of rotation generally paralleling the drive shaft whereby lateral forces exerted on the cam followers by the cam surfaces will be in opposition to each other.

3. The structure as defined in claim 2 wherein said housing means includes a body having a pair of parallel passageways therethrough receiving said guide shafts, set screw means securing the guide shafts adjustably in the passageways, said mounting member being in the form of an inverted U-shaped member having depending parallel legs disposed on opposite sides of the housing means with each of the legs including a pair of apertures slidably receiving the guide shafts therethrough, one end of each guide shaft being threaded and receiving adjustment nuts thereon, said coil springs being disposed between the adjustment nuts and the adjacent surface of one leg of the mounting member for adjustably biasing the mounting member in one direction for biasing the control cam follower toward the control cam surface.

4. The structure as defined in claim 3 wherein said bearing means includes a bearing assembly engaged with the end of the drive shaft and a retaining member threaded into the end of the drive shaft and including a retaining plate engaged with the housing means and bearing assembly to maintain the housing means assembled on the drive shaft.

5. In a cam tracker comprising a carriage adapted to be moved in a predetermined pattern, a drive shaft rotatably supported on said carriage, drive means connected with said shaft, a stationary master cam adjacent the carrier and provided with a cam surface defining the pattern of movement of the carriage, and a master cam surface follower on said drive shaft and being driven thereby, said cam follower engaging the cam surface and following the pattern of the master cam surface, that improvement comprising a control cam spaced axially from the master cam and including a control cam surface in radially opposed relation to the master cam surface and defining the same pattern as the master cam surface, a control cam follower in engagement with the control cam surface, means supporting said control cam follower from the drive shaft whereby radial forces exerted between the control cam surface and control cam follower are in opposition to the radial forces exerted between the master cam surface and master cam follower for more effectively retaining the cam followers engaged with the cam surfaces, said supporting means including a mounting member, means on said drive shaft for supporting the mounting member for lateral movement in relation to the axis of rotation of the drive shaft and means resiliently biasing said control cam follower and master cam follower in opposite directions.

6. The structure as defined in claim 5 wherein said supporting means for the mounting member includes a housing, means rotatably supporting the housing from said drive shaft, means supporting said mounting member on said housing for movement in transverse perpendicular relation to the axis of rotation of the drive shaft.

7. The structure as defined in claim 6 wherein said biasing means includes spring means interconnecting the mounting member and housing to bias the mounting member and control cam follower in one direction.

* * * * *